United States Patent
Nakamura et al.

(10) Patent No.: US 9,595,377 B2
(45) Date of Patent: Mar. 14, 2017

(54) CERAMIC ELECTRONIC COMPONENT AND METHOD FOR PRODUCING CERAMIC ELECTRONIC COMPONENT

(75) Inventors: Akihiro Nakamura, Nagaokakyo (JP); Atsushi Yamamoto, Nagaokakyo (JP); Yuko Nomiya, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 1227 days.

(21) Appl. No.: 13/602,812

(22) Filed: Sep. 4, 2012

(65) Prior Publication Data
US 2012/0326828 A1 Dec. 27, 2012

Related U.S. Application Data

(63) Continuation of application No. PCT/JP2011/055061, filed on Mar. 4, 2011.

(30) Foreign Application Priority Data

Mar. 5, 2010 (JP) ................................. 2010-049457

(51) Int. Cl.
*H01F 5/00* (2006.01)
*B32B 37/14* (2006.01)
(Continued)

(52) U.S. Cl.
CPC ....... *H01F 17/0013* (2013.01); *C04B 35/265* (2013.01); *H01F 1/344* (2013.01);
(Continued)

(58) Field of Classification Search
CPC ....................................................... H01F 1/344
See application file for complete search history.

(56) References Cited

U.S. PATENT DOCUMENTS

| | | | |
|---|---|---|---|
| 5,853,515 | A | 12/1998 | Sano et al. |
| 7,667,377 | B2 | 2/2010 | Yamamoto et al. |

(Continued)

FOREIGN PATENT DOCUMENTS

| | | |
|---|---|---|
| CN | 1218778 A | 6/1999 |
| CN | 1944335 A | 4/2007 |

(Continued)

OTHER PUBLICATIONS

Japanese Office Action issued for counterpart application JP 2012-503285, dispatch date Jan. 30, 2014 (with English translation).
(Continued)

*Primary Examiner* — Ian Rummel
(74) *Attorney, Agent, or Firm* — Arent Fox LLP

(57) ABSTRACT

A ceramic electronic component includes a ferrite material magnetic body part and a Cu conductive part, the ferrite containing 20 to 48% trivalent Fe in terms of $Fe_2O_3$ and divalent Ni. The ferrite can contain Mn so that it is less than 50% of the total of Fe and Mn in terms of $Mn_2O_3$ and $Fe_2O_3$. The magnetic and conductive parts are co-fired at a pressure not exceeding the equilibrium oxygen partial pressure of $Cu-Cu_2O$ thereby ensuring insulating performance and favorable electrical characteristics.

16 Claims, 5 Drawing Sheets

(51) Int. Cl.
*H01F 17/00* (2006.01)
*H01F 1/34* (2006.01)
*H01F 17/04* (2006.01)
*C04B 35/26* (2006.01)

(52) U.S. Cl.
CPC ...... *H01F 17/04* (2013.01); *C04B 2235/3262* (2013.01); *C04B 2235/3279* (2013.01); *C04B 2235/3281* (2013.01); *C04B 2235/3284* (2013.01); *C04B 2235/6025* (2013.01); *C04B 2235/652* (2013.01); *C04B 2235/6582* (2013.01); *C04B 2235/6584* (2013.01); *C04B 2237/68* (2013.01)

(56) References Cited

U.S. PATENT DOCUMENTS

| | | | |
|---|---|---|---|
| 2002/0132898 A1* | 9/2002 | Takaya | H01B 3/442 524/445 |
| 2004/0246088 A1 | 12/2004 | Shoji et al. | |
| 2004/0263285 A1* | 12/2004 | Suzuki | H03H 7/427 333/181 |
| 2010/0085140 A1* | 4/2010 | Tanaka | C04B 35/265 336/221 |
| 2010/0107390 A1 | 5/2010 | Yamamoto et al. | |
| 2010/0283447 A1* | 11/2010 | Tachibana | C04B 35/265 323/304 |

FOREIGN PATENT DOCUMENTS

| | | | |
|---|---|---|---|
| CN | 101183581 A | 5/2008 | |
| JP | 04-061203 A | 2/1992 | |
| JP | H05-175032 A | 7/1993 | |
| JP | 05-326242 A | 12/1993 | |
| JP | 07097525 A | 4/1995 | |
| JP | 08-069939 A | 3/1996 | |
| JP | 09-007880 A | 1/1997 | |
| JP | 2002-217016 A | 8/2002 | |
| JP | 2003-068518 A | 3/2003 | |
| JP | 2004-323283 A | 11/2004 | |
| JP | 2005-001894 A | 1/2005 | |
| JP | 2006-219306 A | 8/2006 | |
| JP | WO 2008133152 A1 * | 11/2008 | ........... C04B 35/265 |
| JP | WO 2009081984 A1 * | 7/2009 | ........... C04B 35/265 |
| JP | 2010-018482 A | 1/2010 | |
| WO | WO-2007-066453 A1 | 6/2007 | |

OTHER PUBLICATIONS

Written Opinion of the International Searching Authority, mailed Jun. 7, 2011.

* cited by examiner

CERAMIC ELECTRONIC COMPONENT AND METHOD FOR PRODUCING CERAMIC ELECTRONIC COMPONENT

This is a continuation of application Serial No. PCT/JP2011/055061, filed Mar. 4, 2011, the entire contents of which are incorporated herein by reference.

TECHNICAL FIELD

The present invention relates to a ceramic electronic component, and a method for producing a ceramic electronic component, and more particularly, relates to a ceramic electronic component such as a coil component including a magnetic body part composed of a ferrite material and a conductive part containing Cu as its main constituent, and a method for producing the ceramic electronic component.

BACKGROUND ART

Conventionally, ceramic electronic components using a ferrite-based magnetic substance which has a spinel type crystal structure, such as Ni—Zn, have been widely used, and active development of ferrite materials has occurred.

For example, Patent Document 1 proposes a ferrite element with an integrally fired copper conductor, in which the raw material composition of the ferrite matrix has a PbO constituent added at a ratio of 0.3 parts by weight or more and 5.0 parts by weight or less with respect to 100 parts by weight of Ni—Zn based ferrite.

Furthermore, Patent Document 1 proposes a ferrite element with an integrally fired copper conductor, in which the raw material composition of the ferrite matrix has a PbO constituent present at an amount of 0.3 parts by weight or more and 5.0 parts by weight or less, a $B_2O_3$ constituent at an amount of 0.03 parts by weight or more and 1.5 parts by weight or less, and a $SiO_2$ constituent at an amount of 0.03 parts by weight or more and 1.5 parts by weight or less, with respect to 100 parts by weight of Ni—Zn based ferrite.

In Patent Document 1, the addition of PbO, or of PbO, $B_2O_3$, and $SiO_2$ as a low-melting-point glass constituent to the ferrite material allows firing at low temperatures of 950 to 1,030° C. in a nitrogen atmosphere.

In addition, Patent Document 2 proposes an oxide ceramic material composed of a sintered body which has a composition containing 0.1 to 0.5 wt % of $Mn_2O_3$ as an accessory constituent with respect to a main constituent composed of 44 to 47 mol % of $Fe_2O_3$, 5 to 13 mol % of CuO, and 15 to 23 mol % of ZnO with the rest substantially composed of NiO, and has an average crystal grain size of 0.7 to 1.2 μm.

In Patent Document 2, the specific resistance ρ is improved by containing 0.1 to 0.5 wt % of $Mn_2O_3$ while a paste of internal electrodes and a paste for oxide magnetic layers are subjected co-firing by the use of Ag in an internal electrode material, thereby achieving a laminate-type inductor which has a favorable quality factor Q and excellent direct-current bias characteristics, without decreasing the sintered density.

In addition, Patent Document 2 discloses that it is also possible to use a Cu-based material as the internal electrode material.

PRIOR ART PATENT DOCUMENTS

Patent Document 1: Japanese Examined Patent Application No. 7-97525 (claim 1, claim 2, lines 7-8 in column 5 of page 3)

Patent Document 2: Japanese Patent Application Laid-Open No. 2006-219306 (claim 1, paragraph numbers [0013], [0019], [0035])

DISCLOSURE OF THE INVENTION

Problem to be Solved by the Invention

A Ni—Zn based ferrite is generally subjected to firing in the atmosphere (air). In the case of a laminated coil component, the ferrite material and an internal electrode material are typically subjected to co-firing at a low temperature of 930° C. or less.

Considering production costs, etc., it is desirable to use a Cu-based material for the internal electrode material. The main constituent, Cu, is low in resistance, excellent in conduction, and less expensive than Ag.

However, it is known from the relationship between the equilibrium oxygen partial pressure of Cu—$Cu_2O$ and the equilibrium oxygen partial pressure of $Fe_2O_3$—$Fe_3O_4$, that there is no region of coexistence of Cu with $Fe_2O_3$ at high temperatures of 800° C. or more.

More specifically, at high temperatures of 800° C. or more, Cu is also oxidized to produce $Cu_2O$ when the firing is carried out with an oxygen partial pressure set to have an oxidizing atmosphere that maintains the state of $Fe_2O_3$. On the other hand, when firing is carried out with an oxygen partial pressure set to realize a reducing atmosphere that maintains the state of the Cu metal, $Fe_2O_3$ is reduced to produce $Fe_3O_4$.

Therefore, Cu and the ferrite material in the case of Patent Document 1 are subjected to co-firing under a nitrogen atmosphere, and there is no region of coexistence of Cu with $Fe_2O_3$. Firing in such a reducing atmosphere that does not oxidize Cu reduces the $Fe_2O_3$ to $Fe_3O_4$, and thereby decreases the specific resistance ρ, and for this reason, there is a possibility of leading to degraded electrical characteristics.

Moreover, the PbO, $B_2O_3$, and $SiO_2$ added as glass constituents in the case of Patent Document 1 cause abnormal grain growth during the firing treatment, thereby leading to a decrease in magnetic permeability, etc., and for this reason, it is difficult to achieve a desired favorable magnetic property. In addition, the PbO contained in the ferrite is also problematic in terms of environmental load.

Patent Document 2 discloses that it is possible to use a Cu-based material for the internal electrode material, but has only an example in which Ag was used for the internal electrode material and subjected to firing in air.

In the case of using a Cu-based material containing Cu as its main constituent for a conductive part and co-firing the conductive part with a magnetic body part, firing in a reducing atmosphere is required from the viewpoint of preventing Cu from being oxidized. Because there is no region for coexistence of Cu with $Fe_2O_3$ at high temperatures of 800° C. or more as described above, a reduction of $Fe_2O_3$ is not able to be avoided when firing is carried out in the reducing atmosphere that prevents the Cu from being oxidized.

Patent Document 2 fails to disclose the problem described above which is caused in the case of using a Cu-based material for a conductive part, and thus, it is difficult from Patent Document 2 to achieve a ceramic electronic component which has favorable insulation performance and favorable electrical characteristics such as impedance characteristics even when a Cu-based material is used for a conductive part.

The present invention has been made in view of the circumstances, and an object of the present invention is to provide a ceramic electronic component such as a coil component, which can ensure insulation performance and achieve favorable electrical characteristics even in the case of co-firing a conductive part containing Cu as its main constituent with a magnetic body part, and a method for producing the ceramic electronic component.

Means for Solving the Problem

The inventors have carried out earnest research on ferrite materials of spinel type crystal structure represented by the general formula $X_2O_3 \cdot MeO$ to find that desired favorable insulation performance can be achieved by adjusting the content of $Fe_2O_3$ to the range of 20 to 48 mol % (preferably 25 to 47 mol %, more preferably 30 to 46 mol %) to increase the amount of other constituents present, and adjusting the amount of Mn to less than 50% of the combined amounts of Fe and Mn in terms of $Fe_2O_3$ and $Mn_2O_3$, thereby making it possible to achieve a ceramic electronic component which has favorable electrical characteristics even in the case of co-firing a Cu based material with a ferrite material.

The present invention has been achieved on the basis of this finding, and a ceramic electronic component according to the present invention includes: a magnetic body part composed of a ferrite material; and a conductive part containing Cu as its main constituent, the ceramic electronic component being characterized in that the magnetic body part contains trivalent Fe and divalent element(s) including at least divalent Ni, the content of the Fe is 20 to 48% in terms of $Fe_2O_3$, and the magnetic body part optionally contains Mn so that the Mn is less than 50% of the total of the Fe and Mn each in terms of $Mn_2O_3$ and $Fe_2O_3$. The Mn can be absent (0%).

In addition, the Fe content is preferably 25 to 47% in terms of $Fe_2O_3$ in the ceramic electronic component according to the present invention.

Furthermore, the Fe content is more preferably 30 to 46% in terms of $Fe_2O_3$ in the ceramic electronic component according to the present invention.

In addition, it has been found that, as long as the content of $Fe_2O_3$ falls within the above-mentioned range of 20 to 48 mol %, an amount of Mn which is adjusted to 2% or more to the total of Fe and Mn in terms of $Mn_2O_3$ and $Fe_2O_3$, can ensure favorable insulation performance while also improving the magnetic permeability.

More specifically, the magnetic body part in the ceramic electronic component according to the present invention preferably contains the Mn so that the amount of Mn to the total amount of the Fe and the Mn is 2% or more in terms of $Mn_2O_3$ and $Fe_2O_3$.

In addition, the magnetic body part preferably contains 10% or less of Cu in terms of CuO in the ceramic electronic component according to the present invention.

In addition, it has been found as a result of further earnest research by the inventors, that ZnO is preferably present in the magnetic body part from the viewpoint of achieving further favorable characteristics, but the ZnO content greater than 33% decreases the Curie point Tc, possibly causing damage to guaranteed operation at high temperatures, and thereby leading to decreased reliability.

More specifically, the magnetic body part preferably contains 33% or less of Zn in terms of ZnO in the ceramic electronic component according to the present invention.

Furthermore, research results of the inventors have found that the ZnO content is desirably 6 mol % or more in view of magnetic permeability p of the ferrite.

More specifically, the magnetic body part preferably contains 6% or more of Zn in terms of ZnO in the ceramic electronic component according to the present invention.

The ceramic electronic component according to the present invention is preferably obtained by firing in an atmosphere at a pressure equal to or lower than the equilibrium oxygen partial pressure of $Cu-Cu_2O$.

In addition, the ceramic electronic component according to the present invention is preferably obtained by co-firing the magnetic body part with the conductive part.

The ceramic electronic component according to the present invention is preferably obtained by alternately stacking the magnetic body part and the conductive part more than once.

In addition, the ceramic electronic component according to the present invention is preferably a coil component.

A method for producing a ceramic electronic component according to the present invention can include: a calcination procedure of preparing a calcined powder by calcination after weighing a Fe compound and divalent element compound(s) including at least a Ni compound so that the Fe compound is 20 to 48% in terms of $Fe_2O_3$, also weighing a Mn compound so that the ratio of Mn to the total of the Fe and the Mn is less than 50% (including 0%) in terms of $Mn_2O_3$ and $Fe_2O_3$, and mixing these weighed materials; a ceramic green sheet preparation procedure of preparing a ceramic green sheet from the calcined powder; a conductive film formation procedure of applying a conductive paste containing Cu as its main constituent to the ceramic green sheet to form a conductive film in a predetermined pattern; a laminated body formation procedure of forming a laminated body by stacking the ceramic green sheet with the conductive film formed in predetermined order; and a firing procedure of co-firing the ceramic green sheet with the conductive film by firing the laminated body in a firing atmosphere at a pressure equal to or lower than the equilibrium oxygen partial pressure of $Cu-Cu_2O$.

Advantageous Effects of the Invention

The ceramic electronic component includes: a magnetic body part composed of a ferrite material; and a conductive part containing Cu as its main constituent, wherein the magnetic body part contains trivalent Fe and divalent element(s) including at least divalent Ni, the content of the Fe is 20 to 48% (preferably 25 to 47%, more preferably 30 to 46%) in terms of $Fe_2O_3$, and the magnetic body part contains Mn so that the amount of Mn to the total of the Fe and the Mn is less than 50% (including 0%) in terms of $Mn_2O_3$ and $Fe_2O_3$. Thus, even in the case of co-firing a Cu based material with the ferrite material, the specific resistance ρ can be improved, and desired insulation performance can be ensured.

Specifically, favorable insulation performance can be achieved with log ρ of 5.0 or more for specific resistance ρ. This insulation performance makes it possible to achieve a desired ceramic electronic component which has favorable electrical characteristics such as impedance characteristics.

In addition, a magnetic body part containing the Mn so that the amount of Mn is 2% or more of the total of the Fe and the Mn in terms of $Mn_2O_3$ and $Fe_2O_3$ can ensure more favorable insulation performance, and also makes it possible to improve the magnetic permeability as compared with the case of having no Mn.

A magnetic body part containing 10% or less of Cu in terms of CuO can achieve a ceramic electronic component which has favorable impedance characteristics.

In addition, when the magnetic body part contains 33% or less of Zn in terms of ZnO, an adequate Curie point can be ensured, and a ceramic electronic component can be achieved which is guaranteed to operate under high temperature conditions for use.

Furthermore, a magnetic body part containing 6% or more of Zn in terms of ZnO makes it possible to ensure a favorable magnetic permeability.

The ceramic electronic component is obtained by firing in an atmosphere at a pressure equal to or lower than the equilibrium oxygen partial pressure of $Cu$—$Cu_2O$. Thus, even in the case of using a conductive part containing Cu as its main constituent for co-firing with the magnetic body part, sintering can be achieved without oxidizing the Cu.

The magnetic body part and the conductive part can be stacked alternately more than once. Thus, a laminate-type ceramic electronic component such as a coil component can be achieved which has favorable insulation performance and favorable electrical characteristics such as impedance characteristics.

In addition, the method for producing a ceramic electronic component according to the present invention includes: providing a calcined powder by calcination of a mixture of a Fe compound and divalent element compound(s) including at least a Ni compound so that the Fe compound is 20 to 48% in terms of $Fe_2O_3$, a Mn compound so that the amount of Mn based on the total of the Fe and the Mn is less than 50% (including 0%) in terms of $Mn_2O_3$ and $Fe_2O_3$ preparing a ceramic green sheet from the calcined powder; applying a conductive paste containing Cu as its main constituent to the ceramic green sheet to form a conductive film in a predetermined pattern; forming a laminated body by stacking the ceramic green sheet in predetermined order; and co-firing the ceramic green sheet with the conductive film by firing the laminated body in a firing atmosphere at a pressure equal to or lower than the equilibrium oxygen partial pressure of $Cu$—$Cu_2O$. Even in the case of co-firing the ceramic green sheet with a conductive film containing Cu as its main constituent in a firing atmosphere at a pressure equal to or lower than the equilibrium oxygen partial pressure of $Cu$—$Cu_2O$, a ceramic electronic component can be achieved which has favorable insulation performance and favorable electrical characteristics such as impedance characteristics without reducing Fe.

BEST MODE FOR CARRYING OUT THE INVENTION

Next, an embodiment of the present invention will be described in detail.

Figure 1:
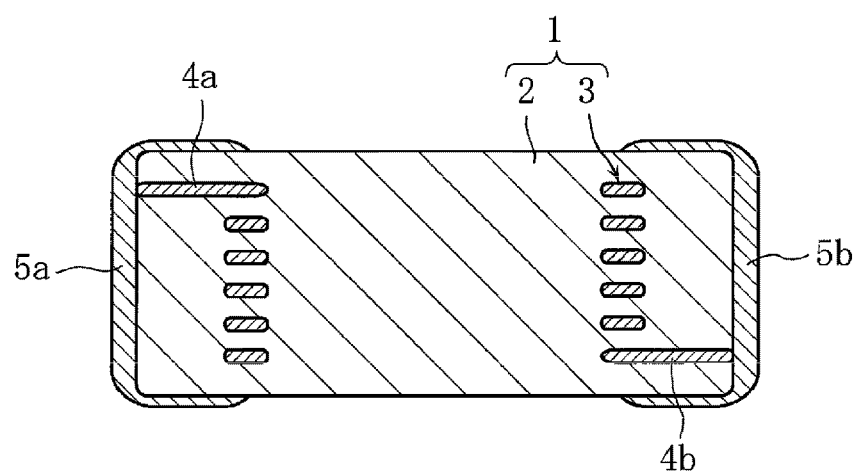
FIG. 1 is a cross-sectional view illustrating an embodiment of a laminated coil component as a ceramic electronic component according to the present invention.

FIG. 1 is a cross-sectional view illustrating an embodiment of a laminated coil component as a ceramic electronic component according to the present invention.

This laminated coil component has a ferrite body 1 including a magnetic body part 2 and a coil conductor (conductive part) 3 containing Cu as its main constituent, which is buried in the magnetic body part 2. In addition, extraction electrodes 4a, 4b are formed on both ends of the coil conductor 3, external electrodes 5a, 5b composed of Ag or the like are also formed on both ends of the ferrite body 1, and the external electrodes 5a, 5b are electrically connected to the extraction electrodes 4a, 4b.

The magnetic body part 2 is formed from a ferrite material which has a spinel type crystal structure (general formula: $X_2O_3.MeO$), contains at least $Fe_2O_3$, which is a trivalent element compound, and NiO, which is a divalent element compound, and if necessary, contains $Mn_2O_3$, which is a trivalent element compound, and ZnO and CuO, which are divalent element compounds.

Further, the composition is determined so that the molar quantity of $Fe_2O_3$ contained in the magnetic body part 2 is 20 to 48 mol %.

This molar quantity of the contained $Fe_2O_3$ from 20 to 48 mol % can ensure desired favorable insulation performance, thereby making it possible to achieve a coil component which has favorable electrical characteristics, such as impedance characteristics.

The molar quantity of $Fe_2O_3$ contained in the magnetic body part 2 is adjusted to 20 to 48 mol % for the following reason.

In the case of co-firing a Cu-based material containing Cu as its main constituent with a ferrite material, there is a need for firing in a reducing atmosphere that does not oxidize the Cu, because firing in the atmosphere (air) easily oxidizes the Cu to produce $Cu_2O$. On the other hand, $Fe_3O_4$ is produced when the $Fe_2O_3$ as a main constituent of the ferrite material is subjected to firing in a reducing atmosphere, and there is thus a need for the $Fe_2O_3$ to be subjected to firing in an oxidizing atmosphere.

However, as mentioned above, it is known that there is no region of coexistence of the Cu metal with the $Fe_2O_3$ in the case of firing at a temperature of 800° C. or more from the relationship between the equilibrium oxygen partial pressure of the $Cu$—$Cu_2O$ and the equilibrium oxygen partial pressure of the $Fe_3O_4$—$Fe_2O_3$.

Thus, the molar quantity of the contained $Fe_2O_3$ containing trivalent Fe in the present embodiment is reduced from the stoichiometric composition, while the amount of, for example, a divalent element compound, specifically NiO, containing divalent Ni is increased from the stoichiometric composition in place of $Fe_2O_3$, thereby improving the reduction resistance of $Fe_2O_3$, and making the reduction of the $Fe_2O_3$ to $Fe_3O_4$ unlikely even in the case of firing in a firing atmosphere at a pressure equal to or lower than the equilibrium oxygen partial pressure of the Cu—Cu$_2$O.

More specifically, the ratio between X$_2$O$_3$ (X: Fe, Mn) and MeO (Me: Ni, Zn, Cu) in the case of a spinel type crystal structure (general formula: X$_2$O$_3$.MeO) is 50:50 in the stoichiometric composition, and the X$_2$O$_3$ and the MeO are typically combined so as to generally have the stoichiometric composition.

Thus, when the molar quantity of the contained Fe$_2$O$_3$ containing trivalent Fe is reduced substantially from the stoichiometric composition, while the amount of divalent element containing divalent Ni is increased substantially over the stoichiometric composition in place of Fe$_2$O$_3$, firing in an atmosphere at a pressure equal to or lower than the equilibrium oxygen partial pressure of the Cu—Cu$_2$O makes it unlikely that the Fe$_2$O$_3$ is reduced to Fe$_3$O$_4$, because the NiO is present substantially excessively over the stoichiometric composition in spite of the reducing atmosphere. More specifically, while Fe$_3$O$_4$ can be represented by Fe$_2$O$_3$.FeO, divalent FeO as in the case of Ni is prevented from being produced, because the NiO as a divalent Ni compound is present substantially excessively over the stoichiometric composition. For this reason, the Fe$_2$O$_3$ can maintain the state of Fe$_2$O$_3$ without being reduced to Fe$_3$O$_4$.

The molar quantity of the contained Fe$_2$O$_3$ is reduced substantially from the stoichiometric composition while the amount of the divalent element compound is increased substantially over the stoichiometric composition, thereby making the production of FeO unlikely even in the case of co-firing Cu with the ferrite material, and thus making the Fe$_2$O$_3$ maintain the state of Fe$_2$O$_3$ without being reduced to Fe$_3$O$_4$. Since the Fe$_2$O$_3$ can be kept from being reduced to Fe$_3$O$_4$, the decrease in specific resistance ρ can be thus avoided, thereby ensuring desired favorable insulation performance, and as a result, making it possible to achieve a laminated coil component which has favorable electrical characteristics.

To that end, there is a need to adjust the molar quantity of the contained Fe$_2$O$_3$ to 48 mol % or less. When the molar quantity of the contained Fe$_2$O$_3$ is greater than 48 mol %, the Fe$_2$O$_3$ is reduced by only less than 2 mol % from the stoichiometric composition, and this excessive molar quantity of the contained Fe$_2$O$_3$ thus easily reduces the Fe$_2$O$_3$ to produce Fe$_3$O$_4$, thereby leading to a decrease in specific resistance ρ, and thus making it difficult to achieve a desired laminated coil component.

However, the molar quantity of the contained Fe$_2$O$_3$ needs to be at least 20 mol %. This is because a molar quantity of the contained Fe$_2$O$_3$ less than 20 mol % will in return lead to a decrease in specific resistance ρ, thereby possibly making it impossible to ensure desired insulation performance.

Accordingly, the molar quantity of Fe$_2$O$_3$ contained in the magnetic body part 2 needs to be adjusted to 20 to 48 mol %, and from the perspective of ensuring more favorable insulating performance, preferably 25 to 47 mol %, and more preferably 30 to 46 mol %.

In addition, Mn$_2$O$_3$ contained in the magnetic body part 2 reduces the coercivity and increases the magnetic flux density, thus making it possible to improve the magnetic permeability μ.

To that end, Mn$_2$O$_3$ is preferably contained so that the amount (hereinafter, referred to as an "A value") of Mn$_2$O$_3$ to the total amount of Fe$_2$O$_3$ and Mn$_2$O$_3$ is 2% or more.

However, when the A value is 50% or more, the content of Mn$_2$O$_3$ is higher than the content of Fe$_2$O$_3$, possibly leading to a decrease in insulation performance. Accordingly, there is a need to control the Mn$_2$O$_3$ content to 2% or more and 50% or less in terms of A value.

As long as the molar quantity of the contained Fe$_2$O$_3$ falls within the range of 20 to 48 mol %, the specific resistance ρ can be improved by increasing the amount of Mn$_2$O$_3$ in place of the divalent element compound in the form of substituting some of the Fe with Mn, also thereby making it possible to achieve desired favorable insulation performance.

More specifically, Mn$_2$O$_3$ in the temperature range of 800° C. or more is turned into a reducing atmosphere at a higher oxygen partial pressure as compared with Fe$_2$O$_3$. Therefore, at an oxygen partial pressure equal to or lower than the equilibrium oxygen partial pressure of the Cu—Cu$_2$O, Mn$_2$O$_3$ is turned into a strongly reducing atmosphere as compared with Fe$_2$O$_3$, and for this reason, Mn$_2$O$_3$ is preferentially reduced to allow firing to be completed. More specifically, Mn$_2$O$_3$ is preferentially reduced as compared with Fe$_2$O$_3$, thus allowing a firing treatment to be completed before Fe$_2$O$_3$ is reduced to Fe$_3$O$_4$.

With Mn$_2$O$_3$ contained in the magnetic body part 2, the Mn$_2$O$_3$ is preferentially reduced even when the Cu-based material and the ferrite material are subjected to co-firing at a pressure equal to or lower than the equilibrium oxygen partial pressure of the Cu—Cu$_2$O, thus allowing sintering to be completed before Fe$_2$O$_3$ is reduced, and allowing for more effective coexistence of the Cu metal with Fe$_2$O$_3$. Further, this coexistence can avoid a decrease in specific resistance ρ, and improve the insulation performance. As a result, impedance characteristics in the shape of a mountain can be achieved which has a peak in a specific frequency range, thereby making it possible to improve the electrical characteristics.

It is to be noted that, likewise in this case, the A value of 50% or more makes the content of Mn$_2$O$_3$ higher than the content of Fe$_2$O$_3$, possibly leading to a decrease in insulation performance, whereas the A value less than 2% fails to fully achieve the addition effect of Mn$_2$O$_3$. Accordingly, likewise in the case of substituting some of trivalent Fe with trivalent Mn, the Mn$_2$O$_3$ content is preferably controlled so that the A value is 2% or more and less than 50% in order to achieve desired insulation performance.

As just described, the magnetic body part 2 in the present embodiment contains Fe$_2$O$_3$ and NiO, the Fe$_2$O$_3$ is 20 to 48 mol %, and the amount of NiO and/or Mn$_2$O$_3$ is increased so that the A value is less than 50%. Thus, the decrease in specific resistance ρ can be avoided to ensure insulation performance without damaging the magnetic permeability μ, thereby allowing the electrical characteristics to be improved.

Specifically, the specific resistance ρ can be improved to 5.0 or more in terms of log ρ without damaging the magnetic property, and a laminated coil component suitable for noise absorption can be achieved which has high impedance in a specific frequency range. This result makes it possible to achieve a laminated coil component which has high impedance in a specific frequency range, and has impedance characteristics in the shape of a mountain.

It is to be noted that the contents of NiO, ZnO, and CuO in the magnetic body part 2 are not to be considered particularly limited, and can be set appropriately depending on the molar quantity of the contained Fe$_2$O$_3$. However, in the case of containing ZnO and CuO, the composition is preferably determined so as to have ZnO: 6 to 33 mol %, CuO: 0 to 10 mol %, and NiO: the rest.

The content of ZnO is preferably 33 mol % or less because if the molar quantity of the contained ZnO is greater than 33 mol %, the Curie point Tc will be decreased to make it likely that the operation is not guaranteed at high temperatures.

On the other hand, while the ZnO has the effect of making a contribution to an improvement in magnetic permeability μ, the molar quantity of the contained ZnO needs to be 6 mol % at a minimum in order to produce this effect.

Accordingly, when the magnetic body part 2 contains ZnO, the molar quantity of the contained ZnO is preferably 6 to 33 mol %.

In addition, if the molar quantity of the contained CuO is greater than 10 mol %, there is a possibility of a decrease in specific resistance ρ. Thus, the content of CuO is preferably 10 mol % or less.

Figure 2:
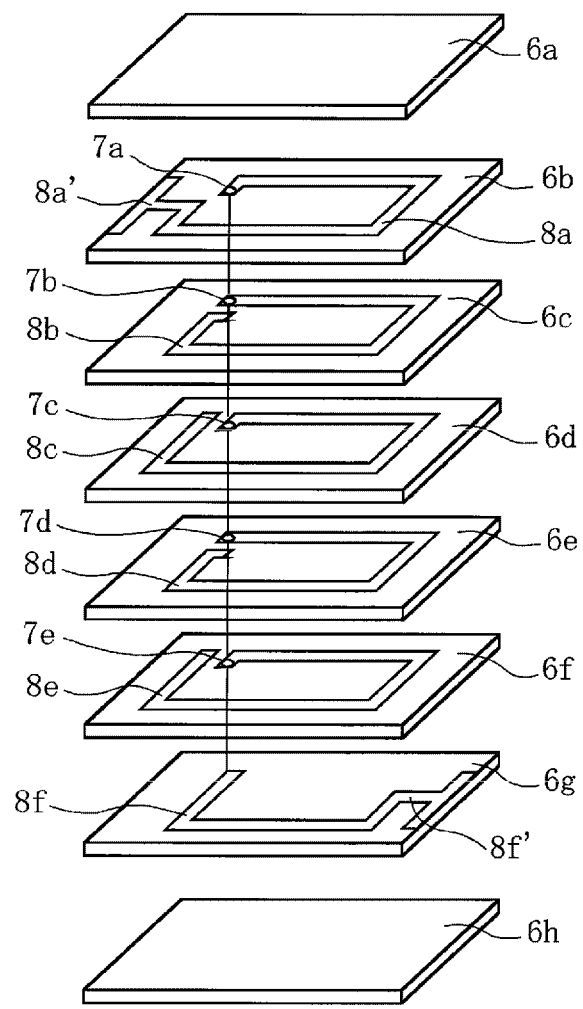
FIG. 2 is an exploded perspective view for explaining a method for producing the laminated coil component.

Next, a method for producing the laminated coil component will be described in detail with reference to FIG. 2.

First, prepared as ceramic raw materials are $Fe_2O_3$, NiO, and if necessary, $Mn_2O_3$ as a trivalent compound and ZnO and CuO as divalent element compounds, and each ceramic raw material is weighed so that the molar quantity of $Fe_2O_3$ contained is 20 to 48 mol % while the A value is less than 50% (including 0%).

Then, these weighed materials are put in a pot mill along with pure water and balls such as PSZ (partially stabilized zirconia) balls, subjected to adequate wet mixing and grinding, and to evaporative drying, and then subjected to calcination at a temperature of 800 to 900° C. for a predetermined period of time.

Then, these calcined materials are put again in a pot mill along with an organic binder such as polyvinyl butyral, an organic solvent such as ethanol and toluene, and PSZ balls, and subjected to adequate mixing and grinding to prepare a ceramic slurry.

Next, the ceramic slurry is subjected to a process of forming into sheets with the use of a doctor blade method or the like to prepare magnetic ceramic green sheets (hereinafter, simply referred to as "magnetic sheets") 6a to 6h with a predetermined film thickness.

Then, a laser processing machine is used to form via holes in predetermined positions of the magnetic sheets 6b to 6g so that the magnetic sheets 6b to 6g can be electrically connected to each other.

Next, prepared is a conductive paste for a coil conductor, which contains Cu as its main constituent. Then, the conductive paste is used to form coil patterns 8a to 8f on the magnetic sheets 6b to 6g by carrying out screen printing, and the via holes are filled with the conductive paste to prepare via hole conductors 7a to 7e. It is to be noted that the respective coil patterns 8a, 8f formed on the magnetic sheet 6b and the magnetic sheet 6g have extraction sections 8a', 8f' formed so as to allow electrically connections to external electrodes.

Then, the magnetic sheets 6b to 6g with the coil patterns 8a to 8f formed are stacked, sandwiched by magnetic sheet 6a and magnetic sheet 6h with no coil pattern formed thereon, and subjected to pressure bonding, thereby preparing a pressure-bonded block with the coil patterns 8a to 8f connected through the via hole conductors 7a to 7e. Thereafter, this pressure-bonded block is cut into a predetermined size to prepare a ceramic laminated body.

Next, this ceramic laminated body is subjected to sufficient degreasing at a predetermined temperature under an atmosphere that does not oxidize Cu, then supplied to a firing furnace in which the atmosphere is adjusted with a mixed gas of $N_2$—$H_2$—$H_2O$ so as to reach a pressure equal to or lower than the equilibrium oxygen partial pressure of Cu—$Cu_2O$, and subjected to firing at 900 to 1,050° C. for a predetermined period of time, thereby achieving a ferrite body 1 with a coil conductor 3 buried in a magnetic body part 2.

Thereafter, a conductive paste for external electrodes, which contains Ag or the like as its main constituent, is applied onto both ends of the ferrite body 1, and subjected to drying, and then to firing at 750° C. to form external electrodes 5a, 5, thereby preparing a laminated coil component.

As just described, the method in the present embodiment includes: preparing a calcined powder by calcination of a mixture of a Fe compound and divalent element compound(s) including at least a Ni compound so that the Fe compound is 20 to 48% in terms of $Fe_2O_3$, a Mn compound so that the amount of Mn to the total amount of the Fe and the Mn is less than 50% (including 0%) in terms of $Mn_2O_3$ and $Fe_2O_3$, preparing a ceramic green sheet from the calcined powder; applying a conductive paste containing Cu as its main constituent to the ceramic green sheet to form a conductive film in a predetermined pattern; forming a laminated body by stacking the ceramic green sheet with the conductive film formed in predetermined order; and co-firing the ceramic green sheet with the conductive film by firing the laminated body in a firing atmosphere at a pressure equal to or lower than the equilibrium oxygen partial pressure of Cu—$Cu_2O$. Thus, even firing the laminated body in a firing atmosphere at a pressure equal to or lower than the equilibrium oxygen partial pressure of Cu—$Cu_2O$ allows sintering with the coexistence of Cu and $Fe_2O_3$, without reducing $Fe_2O_3$ to $Fe_3O_4$. Therefore, the decrease in specific resistance ρ can be avoided to ensure insulation performance, thereby improving the electrical characteristics.

Specifically, the specific resistance ρ can be improved to 5.0 or more in terms of log ρ, and a laminated coil component suitable for noise absorption can be achieved which has high impedance in a specific frequency range. This result makes it possible to achieve a laminated coil component which has high impedance in a specific frequency range, and has impedance characteristics in the shape of a mountain.

It is to be noted that the present invention is not to be considered limited to the embodiment described above. While the laminated coil component according to the present invention has been described in the above embodiment, it is obvious that the present invention can be applied to laminated composite components such as single plate coil components and laminated LC components.

Next, examples of the present invention will be described specifically.

Example 1

$Fe_2O_3$, NiO, ZnO, and CuO were prepared as ceramic raw materials. These ceramic raw materials were weighed so that the molar quantities of the contained $Fe_2O_3$ and NiO provided the compositions as shown in Table 1 with ZnO: 25 mol % and CuO: 1 mol %. The weighed materials were put in a pot mill made of vinyl chloride along with pure water and PSZ balls, and subjected to adequate wet mixing and grinding, to evaporative drying, and then to calcination at a temperature of 850° C.

Then, these calcined materials were put again in a pot mill made of vinyl chloride along with a polyvinyl butyral based binder (organic binder), ethanol (organic solvent), and PSZ balls, and subjected to adequate mixing and grinding to obtain a ceramic slurry.

Next, the ceramic slurry was formed into a sheet with the use of a doctor blade method so as to have a thickness of 25

μm, and this sheet was subjected to punching into a size of 50 mm by 50 mm to prepare magnetic sheets.

The thus prepared multiple magnetic sheets were stacked so as to have a thickness of 0.5 mm in total, heated to 60° C., subjected to pressure bonding by applying a pressure of 100 MPa for 60 seconds, and then cut into the shape of a disk of 10 mm in diameter to obtain a ceramic compact.

The obtained ceramic compact was heated for degreasing sufficiently. A mixed gas of $N_2$—$H_2$—$H_2O$ was supplied to a firing furnace to adjust the oxygen partial pressure to $1.8 \times 10^{-1}$ Pa, and the ceramic compact was then put in the firing furnace, and subjected to firing at a temperature of 950° C. for 2 hours. Since an oxygen partial pressure of $1.8 \times 10^{-1}$ Pa is the equilibrium oxygen partial pressure of Cu—$Cu_2O$ at 950° C., the ceramic compact was subjected to firing at the equilibrium oxygen partial pressure of Cu—$Cu_2O$ for 2 hours, thereby providing disk samples of sample numbers 1 to 13.

Next, an Ag electrode was formed on both sides of each sample of sample numbers 1 to 13, and a direct-current voltage of 50 V was applied to measure the insulation resistance, and the specific resistance ρ was found from the sample shape.

In addition, multiple magnetic sheets obtained in the same way as described above were stacked so as to have a thickness of 1.0 mm in total, heated to 60° C., subjected to pressure bonding by applying a pressure of 100 MPa for 60 seconds, and then cut into the shape of a ring of 20 mm in outside diameter and 12 mm in inside diameter to obtain a ceramic compact.

Then, the obtained ceramic compact was subjected to degreasing and firing under the same conditions as described above, thereby providing ring samples of sample numbers 1 to 13.

For each ring sample of sample numbers 1 to 13, wound with 20 turns of an annealed copper wire, an impedance analyzer (E4991A from Agilent Technologies) was used to measure the inductance at a frequency of 1 MHz, and the magnetic permeability μ was found from the measurement value.

Table 1 shows the composition of the magnetic body part, the A value (the $Mn_2O_3$ content with respect to the total of $Fe_2O_3$ and $Mn_2O_3$), the specific resistance log ρ, and the magnetic permeability μ for sample numbers 1 to 13.

TABLE 1

| Sample Number | Composition of Magnetic Body Part (mol %) | | | | | A value (%) | Specific resistance log ρ (ρ: Ω · cm) | Magnetic Permeability μ (—) |
|---|---|---|---|---|---|---|---|---|
| | $Fe_2O_3$ | $Mn_2O_3$ | NiO | ZnO | CuO | | | |
| 1* | 49.0 | 0 | 25.0 | 25.0 | 1.0 | 0 | 3.5 | 350 |
| 2 | 48.0 | 0 | 26.0 | 25.0 | 1.0 | 0 | 5.5 | 290 |
| 3 | 47.0 | 0 | 27.0 | 25.0 | 1.0 | 0 | 6.6 | 235 |
| 4 | 46.0 | 0 | 28.0 | 25.0 | 1.0 | 0 | 7.4 | 195 |
| 5 | 45.0 | 0 | 29.0 | 25.0 | 1.0 | 0 | 7.7 | 165 |
| 6 | 44.0 | 0 | 30.0 | 25.0 | 1.0 | 0 | 8.0 | 145 |
| 7 | 42.0 | 0 | 32.0 | 25.0 | 1.0 | 0 | 8.2 | 115 |
| 8 | 40.0 | 0 | 34.0 | 25.0 | 1.0 | 0 | 8.1 | 100 |
| 9 | 35.0 | 0 | 39.0 | 25.0 | 1.0 | 0 | 7.6 | 80 |
| 10 | 30.0 | 0 | 44.0 | 25.0 | 1.0 | 0 | 7.1 | 65 |
| 11 | 25.0 | 0 | 49.0 | 25.0 | 1.0 | 0 | 6.5 | 51 |
| 12 | 20.0 | 0 | 54.0 | 25.0 | 1.0 | 0 | 5.8 | 35 |
| 13* | 15.0 | 0 | 59.0 | 25.0 | 1.0 | 0 | 4.5 | 18 |

*is outside the scope of the present invention (claim 1)

Sample number 1 exhibited a low specific resistance log ρ of 3.5. This is believed to be because the high $Fe_2O_3$ content of 49.0 mol % caused reduction of $Fe_2O_3$ to $Fe_3O_4$, thereby resulting in a decrease in specific resistance log ρ, in the case of firing at $1.8 \times 10^{-1}$ Pa which is the equilibrium oxygen partial pressure of Cu—$Cu_2O$ at 950° C.

Sample number 13 with a low $Fe_2O_3$ content of 15.0 mol % also exhibited a low specific resistance log ρ of 4.5 in this case.

In contrast, it has been determined that sample numbers 2 to 12 containing no $Mn_2O_3$, with the $Fe_2O_3$ content of 20.0 to 48.0 mol % within the scope of the present invention, can ensure sufficient insulation performance with a high specific resistance log ρ of 5.5 to 8.2, and moreover, also achieve favorable results of 35 to 290 for the magnetic permeability μ.

In particular, it has been determined that sample numbers 3 to 11 with the $Fe_2O_3$ content of 25.0 to 47.0 mol % achieve more favorable results with a specific resistance log ρ of 6.5 or more, and sample numbers 4 to 10 with the $Fe_2O_3$ content of 30 to 46 mol % achieve further favorable results with a specific resistance log ρ of 7.1 or more.

Example 2

Except for containing 1.0 mol % of $Mn_2O_3$ and accordingly adjusting the NiO content, disk and ring samples of sample numbers 21 to 33 were prepared in accordance with the same method and procedure as in Example 1.

Then, in accordance with the same methods and procedures as in Example 1, the disk samples were used to find the specific resistance log ρ, whereas the ring samples were used to find the magnetic permeability μ.

Table 2 shows the composition of the magnetic body part, the A value, the specific resistance log ρ, and the magnetic permeability μ for sample numbers 21 to 33.

TABLE 2

| Sample Number | Composition of Magnetic Body Part (mol %) | | | | | A value (%) | Specific resistance log ρ (ρ: Ω · cm) | Magnetic Permeability μ (—) |
|---|---|---|---|---|---|---|---|---|
| | $Fe_2O_3$ | $Mn_2O_3$ | NiO | ZnO | CuO | | | |
| 21* | 49.0 | 1.0 | 24.0 | 25.0 | 1.0 | 2.0 | 3.6 | 400 |
| 22 | 48.0 | 1.0 | 25.0 | 25.0 | 1.0 | 2.0 | 6.4 | 330 |
| 23 | 47.0 | 1.0 | 26.0 | 25.0 | 1.0 | 2.1 | 7.3 | 260 |
| 24 | 46.0 | 1.0 | 27.0 | 25.0 | 1.0 | 2.1 | 8.0 | 215 |
| 25 | 45.0 | 1.0 | 28.0 | 25.0 | 1.0 | 2.2 | 8.3 | 180 |
| 26 | 44.0 | 1.0 | 29.0 | 25.0 | 1.0 | 2.2 | 8.5 | 155 |
| 27 | 42.0 | 1.0 | 31.0 | 25.0 | 1.0 | 2.3 | 8.7 | 125 |
| 28 | 40.0 | 1.0 | 33.0 | 25.0 | 1.0 | 2.4 | 8.5 | 108 |
| 29 | 35.0 | 1.0 | 38.0 | 25.0 | 1.0 | 2.8 | 8.3 | 85 |
| 30 | 30.0 | 1.0 | 43.0 | 25.0 | 1.0 | 3.2 | 7.9 | 69 |
| 31 | 25.0 | 1.0 | 48.0 | 25.0 | 1.0 | 3.8 | 7.4 | 54 |
| 32 | 20.0 | 1.0 | 53.0 | 25.0 | 1.0 | 4.8 | 6.7 | 38 |
| 33* | 15.0 | 1.0 | 58.0 | 25.0 | 1.0 | 6.3 | 4.6 | 20 |

*is outside the scope of the present invention (claim 1)

Sample number 21 with the high $Fe_2O_3$ content of 49.0 mol % thus exhibited a low specific resistance log ρ of 3.6 for the same reason as for sample number 1 according to Example 1 described above.

In addition, it has been determined that sample number 33 with the low $Fe_2O_3$ content of 15.0 mol % resulted in a low specific resistance log ρ of 4.6.

In contrast, it has been determined that sample numbers 22 to 32 with the A value of 2.0 to 4.8 and the $Fe_2O_3$ content of 20 to 48 mol % within the scope of the present invention can thus ensure sufficient insulation performance with a high specific resistance log ρ of 6.4 to 8.7.

It has been determined that sample numbers 23 to 31 with the $Fe_2O_3$ content of 25 to 47 mol % achieve more favorable results with a specific resistance log ρ of 7.3 or more, and sample numbers 24 to 30 with the $Fe_2O_3$ content of 30 to 46 mol % achieve further favorable results with a specific resistance log ρ of 7.9 or more.

In addition, it has been determined from sample numbers 22 to 32 that the $Mn_2O_3$ contained at 1.0 mol % results in the magnetic permeability μ of 38 to 330, which means an improvement in magnetic permeability μ as compared with the case of Example 1 with the same $Fe_2O_3$ content.

Example 3

Except for containing 2.0 mol % of $Mn_2O_3$ and accordingly adjusting the NiO content, disk and ring samples of sample numbers 41 to 53 were prepared in accordance with the same method and procedure as in Example 1.

Then, the disk samples were used to find the specific resistance log ρ, whereas the ring samples were used to find the magnetic permeability μ in accordance with the same methods and procedures as in Example 1.

Table 3 shows the composition of the magnetic body part, the A value, the specific resistance log ρ, and the magnetic permeability μ for sample numbers 41 to 53.

TABLE 3

| Sample Number | Composition of Magnetic Body Part (mol %) | | | | | A value (%) | Specific resistance log ρ (ρ: Ω · cm) | Magnetic Permeability μ (—) |
|---|---|---|---|---|---|---|---|---|
| | $Fe_2O_3$ | $Mn_2O_3$ | NiO | ZnO | CuO | | | |
| 41* | 49.0 | 2.0 | 23.0 | 25.0 | 1.0 | 3.9 | 3.7 | 600 |
| 42 | 48.0 | 2.0 | 24.0 | 25.0 | 1.0 | 4.0 | 6.8 | 500 |
| 43 | 47.0 | 2.0 | 25.0 | 25.0 | 1.0 | 4.1 | 7.7 | 400 |
| 44 | 46.0 | 2.0 | 26.0 | 25.0 | 1.0 | 4.2 | 8.2 | 320 |
| 45 | 45.0 | 2.0 | 27.0 | 25.0 | 1.0 | 4.3 | 8.5 | 250 |
| 46 | 44.0 | 2.0 | 28.0 | 25.0 | 1.0 | 4.3 | 8.7 | 210 |
| 47 | 42.0 | 2.0 | 30.0 | 25.0 | 1.0 | 4.5 | 8.9 | 160 |
| 48 | 40.0 | 2.0 | 32.0 | 25.0 | 1.0 | 4.8 | 8.7 | 130 |
| 49 | 35.0 | 2.0 | 37.0 | 25.0 | 1.0 | 5.4 | 8.6 | 94 |
| 50 | 30.0 | 2.0 | 42.0 | 25.0 | 1.0 | 6.3 | 8.3 | 75 |
| 51 | 25.0 | 2.0 | 47.0 | 25.0 | 1.0 | 7.4 | 7.9 | 59 |
| 52 | 20.0 | 2.0 | 52.0 | 25.0 | 1.0 | 9.1 | 7.2 | 42 |
| 53* | 15.0 | 2.0 | 57.0 | 25.0 | 1.0 | 11.8 | 4.7 | 25 |

*is outside the scope of the present invention (claim 1)

Sample number 41 with the high $Fe_2O_3$ content of 49.0 mol % exhibited a low specific resistance log ρ of 3.7 for the same reason as for sample number 1 according to Example 1 described above.

In addition, sample number 53 with the low $Fe_2O_3$ content of 15.0 mol % exhibited a low specific resistance log ρ of 4.7.

In contrast, it has been determined that sample numbers 42 to 52 with the A value of 4.0 to 9.1 and the $Fe_2O_3$ content of 20 to 48 mol % within the scope of the present invention can thus ensure sufficient insulation performance with a high specific resistance log ρ of 6.8 to 8.9.

It has been determined that sample numbers 43 to 51 with the $Fe_2O_3$ content of 25 to 47 mol % achieve more favorable results with a specific resistance log ρ of 7.7 or more, and sample numbers 44 to 50 with the $Fe_2O_3$ content of 30 to 46 mol % achieve further favorable results with a specific resistance log ρ of 8.2 or more.

In addition, it has been determined from sample numbers 42 to 52 that the $Mn_2O_3$ contained at 2.0 mol % results in the magnetic permeability μ of 42 to 500, which means an improvement in magnetic permeability μ as compared with the case of Example 2 with the same $Fe_2O_3$ content.

Example 4

Except for containing 5.0 mol % of $Mn_2O_3$ and accordingly adjusting the NiO content, disk and ring samples of sample numbers 61 to 73 were prepared in accordance with the same method and procedure as in Example 1.

In accordance with the same methods and procedures as in Example 1, the disk samples were used to find the specific resistance log ρ, whereas the ring samples were used to find the magnetic permeability μ.

Table 4 shows the composition of the magnetic body part, the A value, the specific resistance log ρ, and the magnetic permeability μ for sample numbers 61 to 73.

Sample number 61 with the high $Fe_2O_3$ content of 49.0 mol % exhibited a low specific resistance log ρ of 3.6 for the same reason as for sample number 1 according to Example 1.

In addition, sample number 73 with the low $Fe_2O_3$ content of 15.0 mol % exhibited a low specific resistance log ρ of 4.8.

In contrast, it has been determined that sample numbers 62 to 72 with the A value of 9.4 to 20.0 and the $Fe_2O_3$ content of 20 to 48 mol % within the scope of the present invention can ensure sufficient insulation performance with a high specific resistance log ρ of 6.4 to 8.6.

It has been determined that sample numbers 63 to 71 with the $Fe_2O_3$ content of 25 to 47 mol % achieve more favorable results with a specific resistance log ρ of 7.4 or more, and sample numbers 64 to 70 with the $Fe_2O_3$ content of 30 to 46 mol % achieve further favorable results with a specific resistance log ρ of 7.8 or more.

In addition, it has been determined from sample numbers 62 to 72 that the $Mn_2O_3$ contained at 5.0 mol % results in the magnetic permeability μ of 50 to 640, which means an improvement in magnetic permeability μ as compared with the case of Example 3 with the same $Fe_2O_3$ content.

Example 5

Except for containing 7.5 mol % of $Mn_2O_3$ and accordingly adjusting the NiO content, disk and ring samples of sample numbers 81 to 93 were prepared in accordance with the same method and procedure as in Example 1.

In accordance with the same methods and procedures as in Example 1, the disk samples were used to find the specific resistance log ρ, whereas the ring samples were used to find the magnetic permeability μ.

Table 5 shows the composition of the magnetic body part, the A value, the specific resistance log ρ, and the magnetic permeability μ for sample numbers 81 to 93.

TABLE 4

| Sample Number | Composition of Magnetic Body Part (mol %) | | | | | A value (%) | Specific resistance log ρ (ρ: Ω · cm) | Magnetic Permeability μ (—) |
|---|---|---|---|---|---|---|---|---|
| | $Fe_2O_3$ | $Mn_2O_3$ | NiO | ZnO | CuO | | | |
| 61* | 49.0 | 5.0 | 20.0 | 25.0 | 1.0 | 9.3 | 3.6 | 750 |
| 62 | 48.0 | 5.0 | 21.0 | 25.0 | 1.0 | 9.4 | 6.4 | 640 |
| 63 | 47.0 | 5.0 | 22.0 | 25.0 | 1.0 | 9.6 | 7.4 | 520 |
| 64 | 46.0 | 5.0 | 23.0 | 25.0 | 1.0 | 9.8 | 7.9 | 430 |
| 65 | 45.0 | 5.0 | 24.0 | 25.0 | 1.0 | 10.0 | 8.2 | 340 |
| 66 | 44.0 | 5.0 | 25.0 | 25.0 | 1.0 | 10.2 | 8.4 | 280 |
| 67 | 42.0 | 5.0 | 27.0 | 25.0 | 1.0 | 10.6 | 8.6 | 205 |
| 68 | 40.0 | 5.0 | 29.0 | 25.0 | 1.0 | 11.1 | 8.4 | 160 |
| 69 | 35.0 | 5.0 | 34.0 | 25.0 | 1.0 | 12.5 | 8.2 | 110 |
| 70 | 30.0 | 5.0 | 39.0 | 25.0 | 1.0 | 14.3 | 7.8 | 85 |
| 71 | 25.0 | 5.0 | 44.0 | 25.0 | 1.0 | 16.7 | 7.4 | 67 |
| 72 | 20.0 | 5.0 | 49.0 | 25.0 | 1.0 | 20.0 | 6.6 | 50 |
| 73* | 15.0 | 5.0 | 54.0 | 25.0 | 1.0 | 25.0 | 4.8 | 33 |

*is outside the scope of the present invention (claim 1)

TABLE 5

| Sample Number | Composition of Magnetic Body Part (mol %) | | | | | A value (%) | Specific resistance log ρ (ρ: Ω · cm) | Magnetic Permeability μ (—) |
|---|---|---|---|---|---|---|---|---|
| | $Fe_2O_3$ | $Mn_2O_3$ | NiO | ZnO | CuO | | | |
| 81* | 49.0 | 7.5 | 17.5 | 25.0 | 1.0 | 13.3 | 3.5 | 900 |
| 82  | 48.0 | 7.5 | 18.5 | 25.0 | 1.0 | 13.5 | 6.0 | 760 |
| 83  | 47.0 | 7.5 | 19.5 | 25.0 | 1.0 | 13.8 | 7.0 | 625 |
| 84  | 46.0 | 7.5 | 20.5 | 25.0 | 1.0 | 14.0 | 7.5 | 520 |
| 85  | 45.0 | 7.5 | 21.5 | 25.0 | 1.0 | 14.3 | 7.8 | 420 |
| 86  | 44.0 | 7.5 | 22.5 | 25.0 | 1.0 | 14.6 | 8.0 | 340 |
| 87  | 42.0 | 7.5 | 24.5 | 25.0 | 1.0 | 15.2 | 8.2 | 235 |
| 88  | 40.0 | 7.5 | 26.5 | 25.0 | 1.0 | 15.8 | 8.0 | 185 |
| 89  | 35.0 | 7.5 | 31.5 | 25.0 | 1.0 | 17.6 | 7.7 | 125 |
| 90  | 30.0 | 7.5 | 36.5 | 25.0 | 1.0 | 20.0 | 7.3 | 95  |
| 91  | 25.0 | 7.5 | 41.5 | 25.0 | 1.0 | 23.1 | 7.0 | 73  |
| 92  | 20.0 | 7.5 | 46.5 | 25.0 | 1.0 | 27.3 | 6.1 | 55  |
| 93* | 15.0 | 7.5 | 51.5 | 25.0 | 1.0 | 33.3 | 4.8 | 40  |

*is outside the scope of the present invention (claim 1)

Sample number 81 with the high $Fe_2O_3$ content of 49.0 mol % exhibited a low specific resistance log ρ of 3.5 for the same reason as for sample number 1 according to Example 1.

In addition, sample number 93 with the low $Fe_2O_3$ content of 15.0 mol % underwent a decrease in specific resistance log ρ to 4.8.

In contrast, it has been determined that sample numbers 82 to 92 with the A value of 13.5 to 27.3 and the $Fe_2O_3$ content of 20 to 48 mol % within the scope of the present invention can ensure sufficient insulation performance with a high specific resistance log ρ of 6.0 to 8.2.

It has been determined that sample numbers 83 to 91 with the $Fe_2O_3$ content of 25 to 47 mol % achieve more favorable results with a specific resistance log ρ of 7.0 or more, and sample numbers 84 to 90 with the $Fe_2O_3$ content of 30 to 46 mol % achieve further favorable results with a specific resistance log ρ of 7.3 or more.

In addition, it has been determined from samples 82 to 92 that the $Mn_2O_3$ contained at 7.5 mol % results in the magnetic permeability μ of 55 to 760, which means an improvement in magnetic permeability μ as compared with the case of Example 4 with the same $Fe_2O_3$ content.

Example 6

Except for containing 10.0 mol % of $Mn_2O_3$ and accordingly adjusting the NiO content, disk and ring samples of sample numbers 101 to 113 were prepared in accordance with the same method and procedure as in Example 1.

In accordance with the same methods and procedures as in Example 1, the disk samples were used to find the specific resistance log ρ, whereas the ring samples were used to find the magnetic permeability μ.

Table 6 shows the composition of the magnetic body part, the A value, the specific resistance log ρ, and the magnetic permeability μ for sample numbers 101 to 113.

TABLE 6

| Sample Number | Composition of Magnetic Body Part (mol %) | | | | | A value (%) | Specific resistance log ρ (ρ: Ω · cm) | Magnetic Permeability μ (—) |
|---|---|---|---|---|---|---|---|---|
| | $Fe_2O_3$ | $Mn_2O_3$ | NiO | ZnO | CuO | | | |
| 101* | 49.0 | 10.0 | 15.0 | 25.0 | 1.0 | 16.9 | 3.4 | 1100 |
| 102  | 48.0 | 10.0 | 16.0 | 25.0 | 1.0 | 17.2 | 5.6 | 900  |
| 103  | 47.0 | 10.0 | 17.0 | 25.0 | 1.0 | 17.5 | 6.4 | 750  |
| 104  | 46.0 | 10.0 | 18.0 | 25.0 | 1.0 | 17.9 | 6.8 | 630  |
| 105  | 45.0 | 10.0 | 19.0 | 25.0 | 1.0 | 18.2 | 7.1 | 520  |
| 106  | 44.0 | 10.0 | 20.0 | 25.0 | 1.0 | 18.5 | 7.3 | 420  |
| 107  | 42.0 | 10.0 | 22.0 | 25.0 | 1.0 | 19.2 | 7.5 | 280  |
| 108  | 40.0 | 10.0 | 24.0 | 25.0 | 1.0 | 20.0 | 7.3 | 215  |
| 109  | 35.0 | 10.0 | 29.0 | 25.0 | 1.0 | 22.2 | 7.0 | 150  |
| 110  | 30.0 | 10.0 | 34.0 | 25.0 | 1.0 | 25.0 | 6.7 | 110  |
| 111  | 25.0 | 10.0 | 39.0 | 25.0 | 1.0 | 28.6 | 6.4 | 88   |
| 112  | 20.0 | 10.0 | 44.0 | 25.0 | 1.0 | 33.3 | 5.6 | 70   |
| 113* | 15.0 | 10.0 | 49.0 | 25.0 | 1.0 | 40.0 | 4.3 | 55   |

*is outside the scope of the present invention (claim 1)

Sample number 101 with the high $Fe_2O_3$ content of 49.0 mol % exhibited a low specific resistance log ρ of 3.4 for the same reason as for sample number 1 according to Example 1.

Sample number 113 with the low $Fe_2O_3$ content of 15.0 mol % underwent a decrease in specific resistance log ρ to 4.3.

In contrast, it has been determined that sample numbers 102 to 112 with the A value of 17.2 to 33.3 and the $Fe_2O_3$ content of 20 to 48 mol % within the scope of the present invention can ensure sufficient insulation performance with a high specific resistance log ρ of 5.6 to 7.5.

It has been determined that sample numbers 103 to 111 with the $Fe_2O_3$ content of 25 to 47 mol % achieve more favorable results with a specific resistance log ρ of 6.4 or more, and sample numbers 104 to 110 with the $Fe_2O_3$ content of 30 to 46 mol % achieve further favorable results with a specific resistance log ρ of 6.7 or more.

In addition, it has been determined from samples 102 to 112 that the $Mn_2O_3$ contained at 10.0 mol % results in the magnetic permeability μ of 70 to 900, which means an improvement in magnetic permeability μ as compared with the case of Example 5 with the same $Fe_2O_3$ content.

Example 7

Except for containing 13.0 mol % of $Mn_2O_3$ and accordingly adjusting the NiO content, disk and ring samples of sample numbers 121 to 133 were prepared in accordance with the same method and procedure as in Example 1.

In accordance with the same methods and procedures as in Example 1, the disk samples were used to find the specific resistance log ρ, whereas the ring samples were used to find the magnetic permeability μ.

Table 7 shows the composition of the magnetic body part, the A value, the specific resistance log ρ, and the magnetic permeability μ for sample numbers 121 to 133.

TABLE 7

| Sample Number | Composition of Magnetic Body Part (mol %) | | | | | A value (%) | Specific resistance log ρ (ρ: Ω · cm) | Magnetic Permeability μ (—) |
|---|---|---|---|---|---|---|---|---|
| | $Fe_2O_3$ | $Mn_2O_3$ | NiO | ZnO | CuO | | | |
| 121* | 49.0 | 13.0 | 12.0 | 25.0 | 1.0 | 21.0 | 3.3 | 1250 |
| 122 | 48.0 | 13.0 | 13.0 | 25.0 | 1.0 | 21.3 | 5.0 | 1050 |
| 123 | 47.0 | 13.0 | 14.0 | 25.0 | 1.0 | 21.7 | 5.6 | 880 |
| 124 | 46.0 | 13.0 | 15.0 | 25.0 | 1.0 | 22.0 | 6.0 | 730 |
| 125 | 45.0 | 13.0 | 16.0 | 25.0 | 1.0 | 22.4 | 6.3 | 600 |
| 126 | 44.0 | 13.0 | 17.0 | 25.0 | 1.0 | 22.8 | 6.5 | 490 |
| 127 | 42.0 | 13.0 | 19.0 | 25.0 | 1.0 | 23.6 | 6.7 | 340 |
| 128 | 40.0 | 13.0 | 21.0 | 25.0 | 1.0 | 24.5 | 6.5 | 260 |
| 129 | 35.0 | 13.0 | 26.0 | 25.0 | 1.0 | 27.1 | 6.2 | 180 |
| 130 | 30.0 | 13.0 | 31.0 | 25.0 | 1.0 | 30.2 | 6.0 | 130 |
| 131 | 25.0 | 13.0 | 36.0 | 25.0 | 1.0 | 34.2 | 5.6 | 105 |
| 132 | 20.0 | 13.0 | 41.0 | 25.0 | 1.0 | 39.4 | 5.0 | 87 |
| 133* | 15.0 | 13.0 | 46.0 | 25.0 | 1.0 | 46.4 | 3.6 | 70 |

*is outside the scope of the present invention (claim 1)

Sample number 121 with the high $Fe_2O_3$ content of 49.0 mol % exhibited a low specific resistance log ρ of 3.3 for the same reason as for sample number 1 according to Example 1.

Sample number 133 with the low $Fe_2O_3$ content of 15.0 mol % underwent a decrease in specific resistance log ρ to 3.6.

In contrast, it has been determined that sample numbers 122 to 132 with the A value of 21.3 to 39.4 and the $Fe_2O_3$ content of 20 to 48 mol % within the scope of the present invention can ensure sufficient insulation performance with a high specific resistance log ρ of 5.0 to 6.7.

It has been determined that sample numbers 123 to 131 with the $Fe_2O_3$ content of 25 to 47 mol % achieve more favorable results with a specific resistance log ρ of 5.6 or more, and sample numbers 124 to 130 with the $Fe_2O_3$ content of 30 to 46 mol % achieve further favorable results with a specific resistance log ρ of 6.0 or more.

In addition, it has been determined from samples 122 to 132 that the $Mn_2O_3$ contained at 13.0 mol % results in the magnetic permeability μ of 87 to 1,050, which means an improvement in magnetic permeability μ as compared with the case of Example 6 with the same $Fe_2O_3$ content.

As being clear from Examples 1 to 7, it has been determined that a $Fe_2O_3$ content adjusted to 20 to 48 mol % can ensure sufficient insulation performance with a specific resistance log ρ of 5.0 or more, while the increased $Mn_2O_3$ content improves the magnetic permeability μ.

Example 8

$Fe_2O_3$ and $Mn_2O_3$ were weighed so as to provide the compositions as shown in Table 8, substituting some of $Fe_2O_3$ with $Mn_2O_3$, containing no CuO with NiO: 26.0 mol % and ZnO: 25.0 mol %.

In accordance with the same methods as in Example 1, disk samples of sample numbers 141 to 154 were prepared, and the specific resistance log ρ was found.

Table 8 shows the composition of the magnetic body part, the A value, and the specific resistance log ρ for sample numbers 141 to 154.

TABLE 8

| Sample Number | Composition of Magnetic Body Part (mol %) | | | | | A value (%) | Specific resistance log ρ (ρ: Ω · cm) |
|---|---|---|---|---|---|---|---|
| | $Fe_2O_3$ | $Mn_2O_3$ | ZnO | NiO | CuO | | |
| 141* | 49.0 | 0 | 25.0 | 26.0 | 0 | 0 | 4.0 |
| 142* | 48.5 | 0.5 | 25.0 | 26.0 | 0 | 1.0 | 4.9 |
| 143 | 48.0 | 1.0 | 25.0 | 26.0 | 0 | 2.0 | 5.7 |
| 144 | 47.5 | 1.5 | 25.0 | 26.0 | 0 | 3.1 | 6.4 |
| 145 | 47.0 | 2.0 | 25.0 | 26.0 | 0 | 4.1 | 7.0 |
| 146 | 46.0 | 3.0 | 25.0 | 26.0 | 0 | 6.1 | 7.5 |
| 147 | 44.0 | 5.0 | 25.0 | 26.0 | 0 | 10.2 | 7.9 |
| 148 | 41.5 | 7.5 | 25.0 | 26.0 | 0 | 15.3 | 7.4 |
| 149 | 39.0 | 10.0 | 25.0 | 26.0 | 0 | 20.4 | 7.0 |
| 150 | 36.0 | 13.0 | 25.0 | 26.0 | 0 | 26.5 | 6.4 |
| 151 | 34.0 | 15.0 | 25.0 | 26.0 | 0 | 30.6 | 6.1 |
| 152 | 29.0 | 20.0 | 25.0 | 26.0 | 0 | 40.8 | 5.3 |
| 153* | 24.0 | 25.0 | 25.0 | 26.0 | 0 | 51.0 | 4.8 |
| 154* | 19.0 | 30.0 | 25.0 | 26.0 | 0 | 61.2 | 4.5 |

*is outside the scope of the present invention (claim 1)

Sample numbers 141, and 142 with the high $Fe_2O_3$ contents of 49.0 mol %, and 48.5 mol % exhibited low specific resistances log ρ of 4.0, and 4.9 for the same reason as for sample number 1 according to Example 1.

Sample numbers 153, and 154 with an A value of 50% or more and the $Mn_2O_3$ content higher than the $Fe_2O_3$ content in the magnetic body underwent decreases in specific resistances log ρ to 4.8, and 4.5.

In contrast, it has been determined that sample numbers 143 to 152 with the $Fe_2O_3$ content of 29.0 to 40.8 mol % and an A value of 2.0 to 40.8% both within the scope of the present invention achieve favorable insulation performance with a specific resistance log ρ of 5.3 to 7.9.

Example 9

Except for adjusting the CuO content in Example 8 to 5.0 mol % and accordingly adjusting the NiO content, disk samples of sample numbers 161 to 174 were prepared in accordance with the same method and procedure as in Example 1, and the specific resistances ρ were found.

Table 9 shows the composition of the magnetic body part, the A value, and the specific resistance log ρ for sample numbers 161 to 174.

TABLE 9

| Sample Number | Composition of Magnetic Body Part (mol %) | | | | | A value (%) | Specific resistance log ρ (ρ: Ω · cm) |
|---|---|---|---|---|---|---|---|
| | $Fe_2O_3$ | $Mn_2O_3$ | ZnO | NiO | CuO | | |
| 161* | 49.0 | 0 | 25.0 | 21.0 | 5.0 | 0 | 3.5 |
| 162* | 48.5 | 0.5 | 25.0 | 21.0 | 5.0 | 1.0 | 4.5 |
| 163 | 48.0 | 1.0 | 25.0 | 21.0 | 5.0 | 2.0 | 5.5 |
| 164 | 47.5 | 1.5 | 25.0 | 21.0 | 5.0 | 3.1 | 6.1 |
| 165 | 47.0 | 2.0 | 25.0 | 21.0 | 5.0 | 4.1 | 6.6 |
| 166 | 46.0 | 3.0 | 25.0 | 21.0 | 5.0 | 6.1 | 7.3 |
| 167 | 44.0 | 5.0 | 25.0 | 21.0 | 5.0 | 10.2 | 7.9 |
| 168 | 41.5 | 7.5 | 25.0 | 21.0 | 5.0 | 15.3 | 7.4 |
| 169 | 39.0 | 10.0 | 25.0 | 21.0 | 5.0 | 20.4 | 7.0 |
| 170 | 36.0 | 13.0 | 25.0 | 21.0 | 5.0 | 26.5 | 6.4 |
| 171 | 34.0 | 15.0 | 25.0 | 21.0 | 5.0 | 30.6 | 6.0 |
| 172 | 29.0 | 20.0 | 25.0 | 21.0 | 5.0 | 40.8 | 5.2 |
| 173* | 24.0 | 25.0 | 25.0 | 21.0 | 5.0 | 51.0 | 4.7 |
| 174* | 19.0 | 30.0 | 25.0 | 21.0 | 5.0 | 61.2 | 4.4 |

*is outside the scope of the present invention (claim 1)

Sample numbers 161, and 162 with the high $Fe_2O_3$ contents of 49.0 mol %, and 48.5 mol % exhibited low specific resistances log ρ of 3.5, and 4.5 for the same reason as for sample number 1 according to Example 1.

Sample numbers 173, and 174 with the A value of 50% or more and the $Mn_2O_3$ content higher than the $Fe_2O_3$ content in the magnetic body underwent decreases in specific resistances log ρ to 4.7, and 4.4.

In contrast, it has been determined that sample numbers 163 to 172 with the $Fe_2O_3$ content of 29.0 to 40.8 mol % and the A value of 2.0 to 40.8 mol % within the scope of the present invention thus achieve favorable insulation performance with a specific resistance log ρ of 5.2 to 7.9.

Example 10

Except for adjusting the CuO content in Example 8 to 10.0 mol % and accordingly adjusting the NiO content, disk samples of sample numbers 181 to 194 were prepared in accordance with the same method and procedure as in Example 1, and the specific resistances ρ of the samples were found.

Table 10 shows the composition of the magnetic body part, the A value, and the specific resistance log ρ for sample numbers 181 to 194.

TABLE 10

| Sample Number | Composition of Magnetic Body Part (mol %) | | | | | A value (%) | Specific resistance log ρ (ρ: Ω · cm) |
|---|---|---|---|---|---|---|---|
| | $Fe_2O_3$ | $Mn_2O_3$ | ZnO | NiO | CuO | | |
| 181* | 49.0 | 0 | 25.0 | 16.0 | 10.0 | 0 | 3.2 |
| 182* | 48.5 | 0.5 | 25.0 | 16.0 | 10.0 | 1.0 | 4.2 |
| 183 | 48.0 | 1.0 | 25.0 | 16.0 | 10.0 | 2.0 | 5.0 |
| 184 | 47.5 | 1.5 | 25.0 | 16.0 | 10.0 | 3.1 | 5.6 |
| 185 | 47.0 | 2.0 | 25.0 | 16.0 | 10.0 | 4.1 | 6.2 |
| 186 | 46.0 | 3.0 | 25.0 | 16.0 | 10.0 | 6.1 | 7.0 |
| 187 | 44.0 | 5.0 | 25.0 | 16.0 | 10.0 | 10.2 | 7.6 |
| 188 | 41.5 | 7.5 | 25.0 | 16.0 | 10.0 | 15.3 | 7.5 |
| 189 | 39.0 | 10.0 | 25.0 | 16.0 | 10.0 | 20.4 | 7.1 |
| 190 | 36.0 | 13.0 | 25.0 | 16.0 | 10.0 | 26.5 | 6.6 |
| 191 | 34.0 | 15.0 | 25.0 | 16.0 | 10.0 | 30.6 | 6.2 |
| 192 | 29.0 | 20.0 | 25.0 | 16.0 | 10.0 | 40.8 | 5.4 |
| 193* | 24.0 | 25.0 | 25.0 | 16.0 | 10.0 | 51.0 | 4.8 |
| 194* | 19.0 | 30.0 | 25.0 | 16.0 | 10.0 | 61.2 | 4.5 |

*is outside the scope of the present invention (claim 1)

Sample numbers 181, and 182 with the high $Fe_2O_3$ contents of 49.0 mol %, and 48.5 mol % exhibited low specific resistances log ρ of 3.2, and 4.2 for the same reason as for sample number 1 according to Example 1.

Sample numbers 193, and 194 with the A value of 50% or more and the $Mn_2O_3$ content higher than the $Fe_2O_3$ content in the magnetic body underwent decreases in specific resistances log ρ to 4.8, and 4.5.

In contrast, it has been determined that sample numbers 183 to 192 with the $Fe_2O_3$ content of 29.0 to 40.8 mol % and an A value of 2.0 to 40.8 mol % within the scope of the present invention thus achieve favorable insulation performance with a specific resistance log ρ of 5.0 to 7.6.

Example 11

Except for varying the content of ZnO in the range of 1.0 to 35.0 mol % as shown in Table 11 with $Fe_2O_3$: 47 mol %, $Mn_2O_3$: 1.0 mol %, and CuO: 1.0 mol %, and accordingly adjusting the content of NiO, ring samples of sample numbers 201 to 210 were prepared in accordance with the same method and procedure as in Example 1.

In accordance with the same method and procedure as in Example 1, the ring samples were used to find the magnetic permeability μ.

In addition, the same impedance analyzer as in Example 1 was used, for each ring sample, to measure temperature characteristics of magnetic permeability μ, and find the maximum temperature of the magnetic permeability μ as Curie point Tc.

Table 11 shows the composition of the magnetic body part, the A value, the magnetic permeability μ, and the Curie point for sample numbers 201 to 210.

TABLE 11

| Sample Number | Composition of Magnetic Body Part (mol %) | | | | | A value (%) | Magnetic Permeability μ (—) | Curie point Tc (° C.) |
|---|---|---|---|---|---|---|---|---|
| | $Fe_2O_3$ | $Mn_2O_3$ | NiO | ZnO | CuO | | | |
| 201*** | 47.0 | 1.0 | 50.0 | 1.0 | 1.0 | 2.1 | 15 | 550 |
| 202*** | 47.0 | 1.0 | 48.0 | 3.0 | 1.0 | 2.1 | 20 | 515 |
| 203 | 47.0 | 1.0 | 45.0 | 6.0 | 1.0 | 2.1 | 35 | 465 |
| 204 | 47.0 | 1.0 | 42.0 | 9.0 | 1.0 | 2.1 | 55 | 420 |
| 205 | 47.0 | 1.0 | 36.0 | 15.0 | 1.0 | 2.1 | 115 | 340 |
| 206 | 47.0 | 1.0 | 31.0 | 20.0 | 1.0 | 2.1 | 175 | 275 |
| 207 | 47.0 | 1.0 | 26.0 | 25.0 | 1.0 | 2.1 | 260 | 220 |
| 208 | 47.0 | 1.0 | 21.0 | 30.0 | 1.0 | 2.1 | 380 | 165 |
| 209 | 47.0 | 1.0 | 18.0 | 33.0 | 1.0 | 2.1 | 460 | 130 |
| 210** | 47.0 | 1.0 | 16.0 | 35.0 | 1.0 | 2.1 | 510 | 110 |

**is outside the preferred scope of the present invention
***is outside the more preferred scope of the present invention It has been determined that sample number 210 with the high ZnO content of 35.0 mol % undergoes a decrease in Curie point Tc to 110° C., thereby resulting in a guaranteed operating temperature of 125° C. or less, and possibly causing problems with use in a high temperature atmosphere.

In contrast, sample numbers 201 to 209 with the ZnO content of 33.0 mol % or less can ensure the Curie point Tc of 130° C. or more.

However, sample numbers 201, and 202 underwent a decrease in magnetic permeability down to 20 with the ZnO content of 3.0 mol %, and underwent a decrease in magnetic permeability μ down to 15 with the ZnO content of 1.0 mol %.

Accordingly, it has been confirmed that when the magnetic body part contains therein ZnO, the content of ZnO is preferably 33.0 mol % or less, and more preferably 6.0 to 33.0 mol %.

Figure 3:
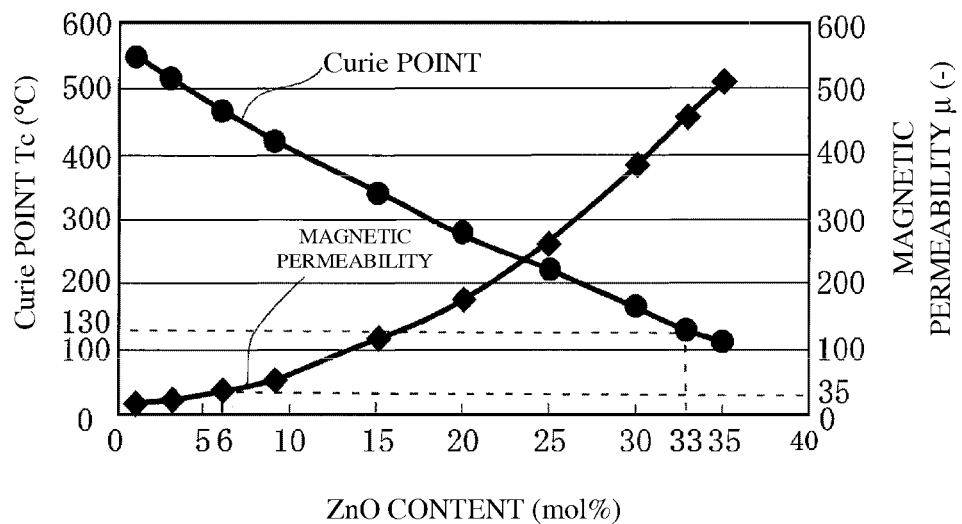
FIG. 3 is a diagram showing the relationships between the content of ZnO and the Curie point Tc and magnetic permeability μ.

FIG. 3 is a diagram showing the relationship between the ZnO content, and the Curie point Tc and the magnetic permeability μ, where the horizontal axis indicates the ZnO content (mol %), the left vertical axis indicates the Curie point Tc, and the right vertical axis indicates the magnetic permeability μ. In the figure, the mark ● refers to the Curie point, whereas the mark ♦ refers to the magnetic permeability.

It is clear from FIG. 3 that with increase in ZnO content, the magnetic permeability μ is increased while the Curie point Tc is decreased, and in order to ensure a guaranteed operating temperature of 125° C., the ZnO content needs to be 33 mol % or more.

On the other hand, with decrease in ZnO content, the magnetic permeability μ is decreased to less than 35 with a ZnO content less than 6 mol %. Accordingly, it has been determined that the content of ZnO is 6 to 33 mol %, and preferably 9 to 33 mol %.

Example 12

Prepared were magnetic sheets of sample number 161 ($Fe_2O_3$: 49.0 mol %, $Mn_2O_3$: 0 mol %, ZnO: 25.0 mol %, NiO: 21.0 mol %, CuO: 5.0 mol %) and sample number 167 ($Fe_2O_3$: 44.0 mol %, $Mn_2O_3$: 5.0 mol %, ZnO: 25.0 mol %, NiO: 21.0 mol %, CuO: 5.0 mol %) used in Example 9.

Then, a laser processing machine was used to form via holes in predetermined positions of the magnetic sheets, thereafter, a Cu paste containing a Cu powder, varnish, and an organic solvent was carried out screen printing onto the surfaces of the magnetic sheets, and the via holes were filled with the Cu paste, thereby forming coil patterns in predetermined shapes and via hole conductors.

The magnetic sheets with the coil patterns formed were stacked, sandwiched between magnetic sheets with no coil pattern formed, and subjected to pressure bonding at a pressure of 100 MPa at a temperature of 60° C., thereby preparing pressure-bonded blocks. Then, the pressure-bonded blocks were cut into predetermined sizes to prepare ceramic laminated bodies.

The ceramic laminated bodies were heated in an atmosphere in which Cu as the internal conductor was not oxidized, for sufficient degreasing. Thereafter, the ceramic laminated bodies were put in a firing furnace with an oxygen partial pressure controlled with a mixed gas of $N_2$—$H_2$—$H_2O$, and subjected to firing by heating to 950° C. at a rate of temperature increase of 3° C./min, and holding at 950° C. for 2 hours, thereby preparing ferrite bodies with a coil conductor buried in a magnetic body part. In this case, the oxygen partial pressure was set to $1.8 \times 10^{-1}$ Pa, which is the equilibrium oxygen partial pressure of Cu—$Cu_2O$ at 950° C.

Next, prepared was a conductive paste for external electrodes, containing an Ag powder, glass frit, varnish, and an organic solvent, and the conductive paste for external electrodes was applied onto both ends of the ferrite bodies, subjected to drying, and then firing at 750° C. to form external electrodes, thereby preparing samples of sample numbers 161', and 167'. It is to be noted that each sample of sample numbers 161', and 167' had outside dimensions of length: 1.6 mm, width: 0.8 mm, and thickness: 0.8 mm, and the turn number of the coil was 9.5 turns.

Next, the same impedance analyzer as in Example 1 was used to measure impedance characteristics for each sample of sample numbers 161', and 167'.

Figure 4:
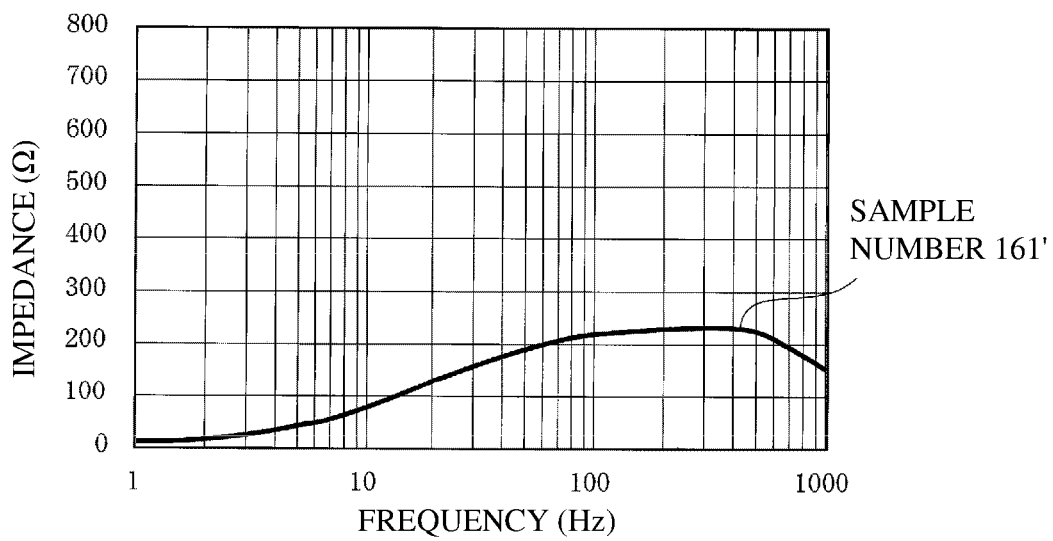
FIG. 4 is a diagram showing an example of impedance characteristics in the case of firing at the equilibrium oxygen partial pressure of $Cu$—$Cu_2O$ when the component composition of a magnetic body part falls outside the scope of the present invention.
Figure 5:
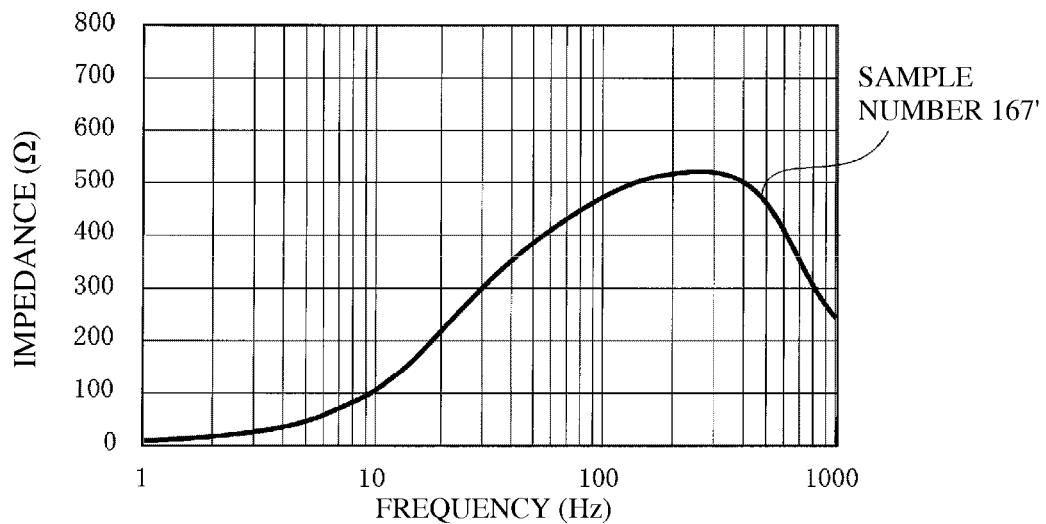
FIG. 5 is a diagram showing an example of impedance characteristics in the case of firing at the equilibrium oxygen partial pressure of $Cu$—$Cu_2O$ when the component composition of a magnetic body part falls within the scope of the present invention.

FIG. 4 shows impedance characteristics for sample number 161' whereas FIG. 5 shows impedance characteristics for sample number 167'. The horizontal axis refers to a frequency (Hz), whereas the vertical axis refers to impedance (Q).

Sample number 161' with the high $Fe_2O_3$ content of 49.0 mol % and the low specific resistance log ρ failed to achieve high desired impedance, with the impedance on the order of 220Ω being a maximum, as being clear from FIG. 4.

In contrast, sample number 167' with the $Fe_2O_3$ content of 44.0 mol % and the A value of 10.2% within the scope of the present invention undergoes an increase in specific resistance log ρ, and as a result, the impedance characteristics also have the distinctive shape of a mountain as shown in FIG. 5. Further, it has been determined that high impedance is achieved in a specific frequency range because of the achievement of the high impedance up to approximately 520Ω.

Example 13

Except that the oxygen partial pressure was set to $1.8 \times 10^{-3}$ Pa, which is 1/100 of the equilibrium oxygen partial pressure of Cu—Cu$_2$O at 950° C., samples of sample numbers 161", and 167" were prepared in accordance with the same method and procedure as in Example 12, and the impedance characteristics of the samples were measured.

Figure 6:
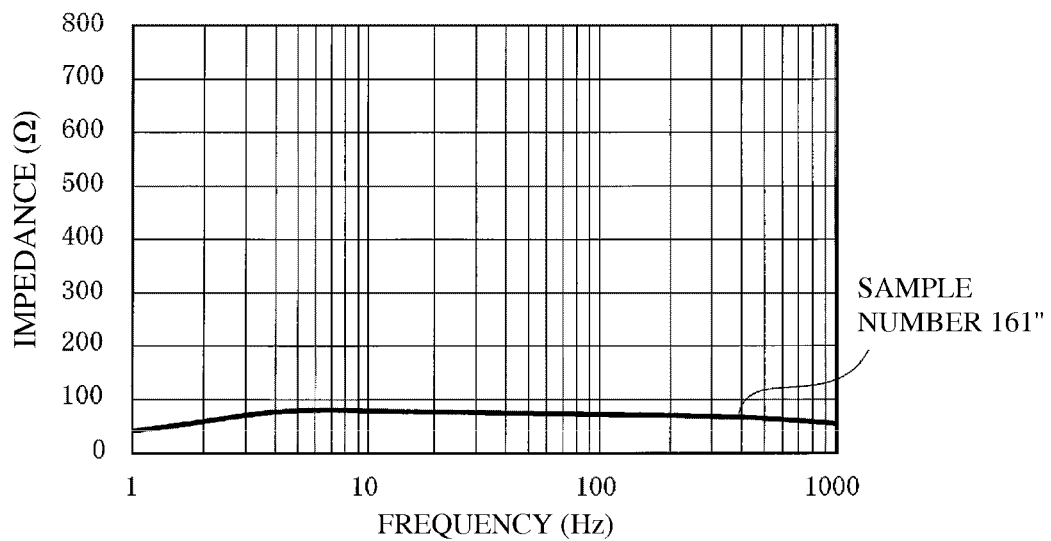
FIG. 6 is a diagram showing an example of impedance characteristics in the case of firing at $1/100$ of the equilibrium oxygen partial pressure of $Cu$—$Cu_2O$ when the component composition of a magnetic body part falls outside the scope of the present invention.
Figure 7:
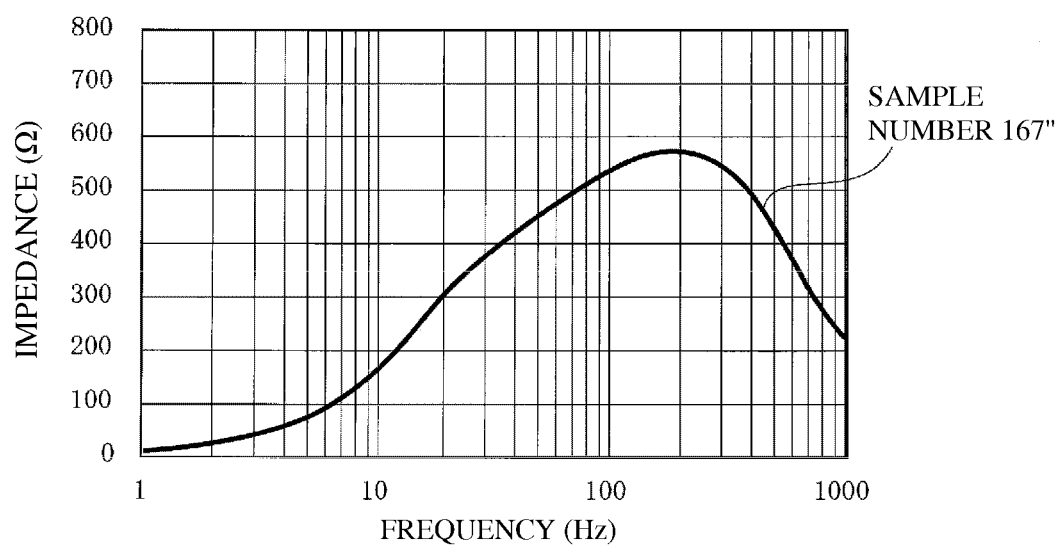
FIG. 7 is a diagram showing an example of impedance characteristics in the case of firing at $1/100$ of the equilibrium oxygen partial pressure of $Cu$—$Cu_2O$ when the component composition of a magnetic body part falls within the scope of the present invention.

FIG. 6 shows impedance characteristics for sample number 161", whereas FIG. 7 shows impedance characteristics for sample number 167". The horizontal axis refers to a frequency (Hz), whereas the vertical axis refers to impedance (Ω).

Sample number 161" with the high Fe$_2$O$_3$ content of 49.0 mol %, and subjected to firing at the low oxygen partial pressure of 1/100 of the equilibrium oxygen partial pressure of Cu—Cu$_2$O, failed to achieve favorable impedance characteristics because the specific resistance log ρ is also further decreased, and as a result, the impedance of 100Ω or less is flat in a wide frequency range as shown in FIG. 6.

In contrast, sample number 167" with the Fe$_2$O$_3$ content of 44.0 mol % and an A value of 10.2% within the scope of the present invention undergoes an increase in specific resistance log ρ, and as a result, the impedance characteristics also have the distinctive shape of a mountain as shown in FIG. 7, substantially as in the case of sample number 167' in Example 12. Further, it has been determined that high impedance is achieved in a specific frequency range because of the achievement of the high impedance up to approximately 570Ω.

In addition, it is clear from a comparison of sample number 167' in Example 12 with sample number 167" in Example 13, that high impedance can be achieved without depending on the oxygen partial pressure, when the Fe$_2$O$_3$ content falls within the scope of the present invention.

As just described, it has been determined that a ceramic electronic component which has the magnetic composition according to the present invention has a favorable specific resistance log ρ, and thereby can ensure high impedance without damaging the magnetic permeability. More specifically, it has been confirmed that a laminated coil component is achieved which has favorable insulation performance and favorable impedance characteristics, even in the case of using a material containing Cu as its main constituent for an internal electrode material.

INDUSTRIAL APPLICABILITY

Even in the case of using a material containing Cu as its main constituent for a conductive part, and co-firing the conductive part with a magnetic body part, ceramic electronic components such as coil components can be achieved which have favorable insulation performance and favorable electrical characteristics.

In this description, all parts and percentages are in mols unless otherwise indicated.

DESCRIPTION OF REFERENCE SYMBOLS

2 magnetic body part
3 coil conductor (conductive part)

The invention claimed is:
1. A ceramic electronic component comprising:
a unitary body having a magnetic body part and a conductive part containing Cu as a main constituent thereof buried in the unitary body,
the magnetic body part containing
one or more divalent elements including at least divalent Ni,
20 to 48 mol % of Fe$_2$O$_3$,
10 mol % or less of CuO,
33 mol % or less of ZnO, and
2% or more and less than 50% of Mn$_2$O$_3$ based on a total of the Fe$_2$O$_3$ and the Mn$_2$O$_3$,
wherein the ceramic electronic component has been fired at a pressure equal to or lower than an equilibrium oxygen partial pressure of Cu—Cu$_2$O.
2. The ceramic electronic component according to claim 1, in which a plurality of pairs of the magnetic body part and conductive part are stacked such that at least one conductive part is sandwiched between adjacent magnetic body parts.
3. The ceramic electronic component according to claim 2, wherein the ceramic electronic component is a coil component.
4. The ceramic electronic component according to claim 1, wherein the magnetic body part contains 25 to 47 mol % of Fe$_2$O$_3$.
5. The ceramic electronic component according to claim 4, wherein the magnetic body part contains 30 to 46 mol % of Fe$_2$O$_3$.
6. The ceramic electronic component according to claim 5, wherein the magnetic body part contains at least 1% of CuO, and at least 6% of ZnO.
7. The ceramic electronic component according to claim 1, wherein the magnetic body part contains 6% or more of ZnO.
8. The ceramic electronic component according to claim 1, wherein the magnetic body part and the conductive part of the ceramic electronic component were co-fired.
9. A ceramic electronic component comprising:
a unitary body having a magnetic body part and a conductive part containing Cu as a main constituent thereof buried in the unitary body,
the magnetic body part containing
one or more divalent elements including at least divalent Ni,
20 to 48 mol % of Fe$_2$O$_3$,
10 mol % or less of CuO,
33 mol % or less of ZnO, and
2% or more and less than 50% of Mn$_2$O$_3$ based on a total of the Fe$_2$O$_3$ and the Mn$_2$O$_3$,
wherein the magnetic body part and the conductive part of the ceramic electronic component were co-fired.
10. The ceramic electronic component according to claim 9, wherein the magnetic body part contains 25 to 47 mol % of Fe$_2$O$_3$.
11. The ceramic electronic component according to claim 10, wherein the magnetic body part contains 30 to 46 mol % of Fe$_2$O$_3$.
12. The ceramic electronic component according to claim 11, wherein the magnetic body part contains at least 1% of CuO, and at least 6% of ZnO.
13. The ceramic electronic component according to claim 12, wherein the ceramic electronic component has been fired at a pressure equal to or lower than an equilibrium oxygen partial pressure of Cu—Cu$_2$O.
14. The ceramic electronic component according to claim 9, wherein the magnetic body part contains 6% or more of ZnO.

15. The ceramic electronic component according to claim 9, in which a plurality of pairs of the magnetic body part and conductive part are stacked such that at least one conductive part is sandwiched between adjacent magnetic body parts.

16. The ceramic electronic component according to claim 15, wherein the ceramic electronic component is a coil component.

\* \* \* \* \*